Oct. 5, 1943.   O. SUTTLES   2,331,006
TRAILER TOWING CONNECTION
Filed Feb. 19, 1940   2 Sheets-Sheet 1

INVENTOR:
OMAR SUTTLES
BY
O O Martin
ATTORNEY.

Oct. 5, 1943.  O. SUTTLES  2,331,006
TRAILER TOWING CONNECTION
Filed Feb. 19, 1940  2 Sheets-Sheet 2
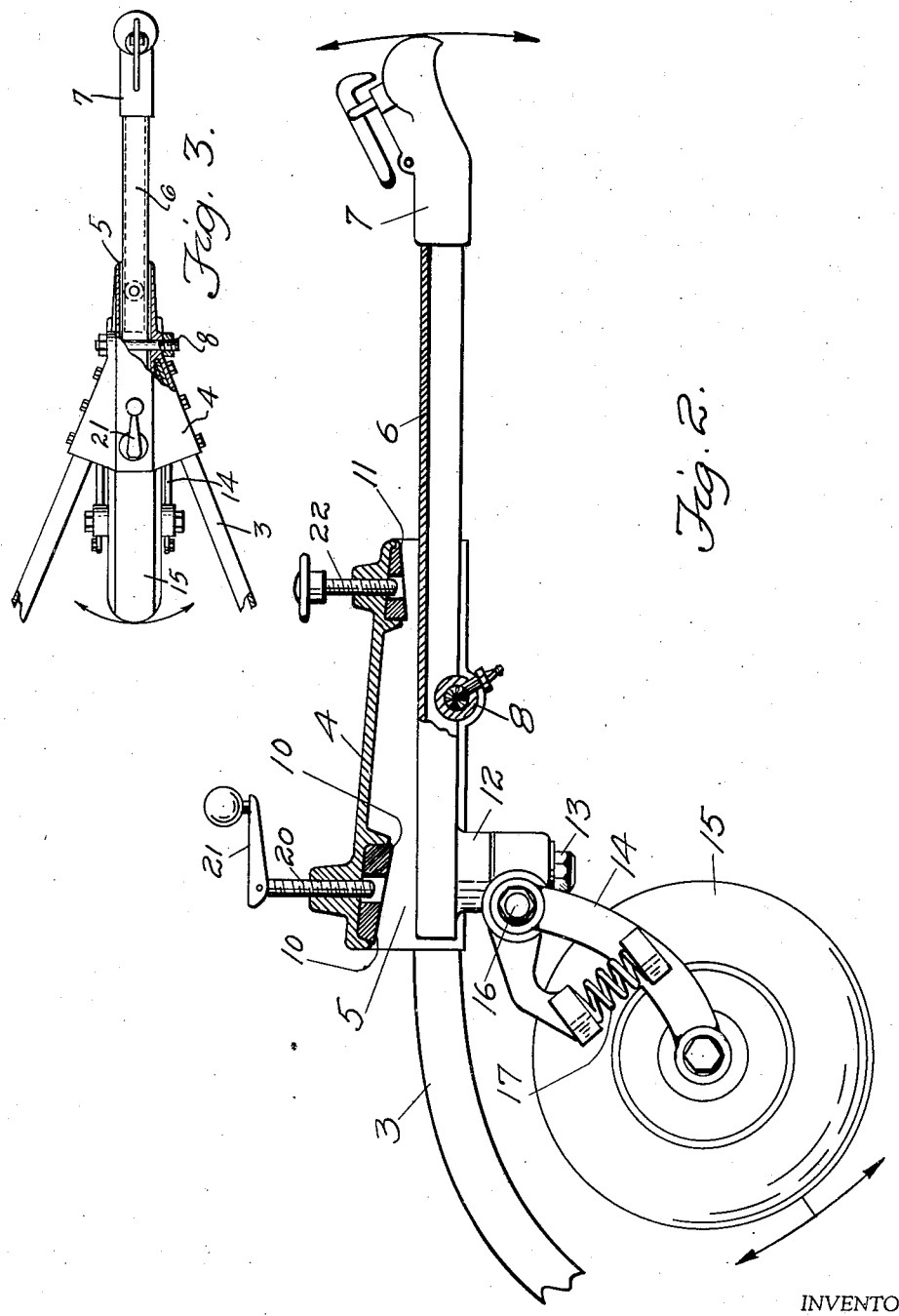
INVENTOR:
OMAR SUTTLES
BY O. O. Martin
ATTORNEY.

Patented Oct. 5, 1943

2,331,006

UNITED STATES PATENT OFFICE 2,331,006

TRAILER TOWING CONNECTION

Omar Suttles, Los Angeles, Calif.

Application February 19, 1940, Serial No. 319,665

22 Claims. (Cl. 280—33.44)

The present invention relates to trailers and to towing devices for trailers, and has particular reference to improvements in weight supporting and balancing means embodied in such towing devices.

The general object of the invention is to provide simple and sturdy towing means capable of so distributing the overhanging weight of a trailer that only the proportion of the weight which is necessary in order to secure a check on side thrust on the towing vehicle and sufficient ground grip to insure proper traction is imposed on the towing vehicle.

A further object is the provision of trailer connections which may be readily uncoupled from the towing vehicle and which will maintain the position of the trailer substantially unchanged after it has been uncoupled, without the necessity of providing additional support therefor.

With these and other objects in view, the invention resides in the combinations and in the novel, important features which now will be described in detail. A preferred form of the invention is illustrated in the appended drawings, of which:

Fig. 2 is a substantially corresponding view, on a larger scale, of the towing connections; and Fig. 3 is a plan view of the device substantially in agreement with the foregoing views.

Figure 1:
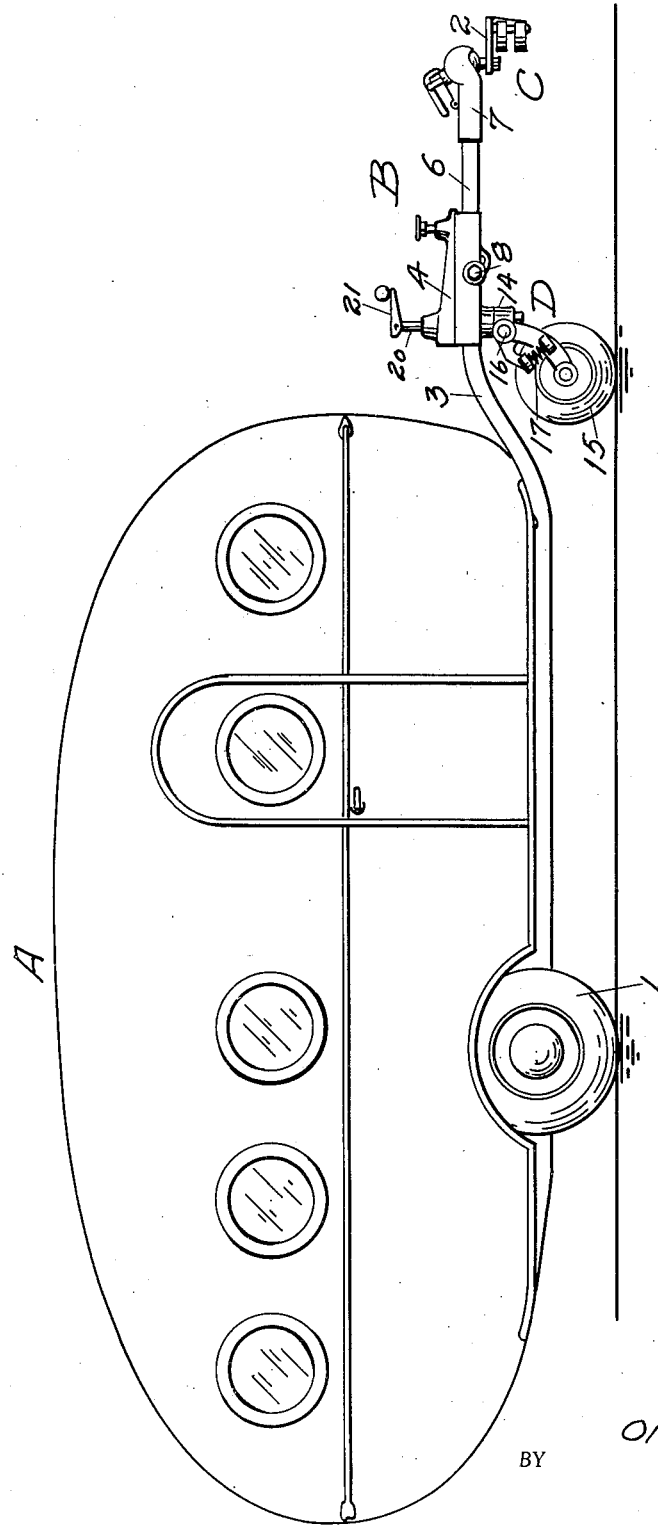
Fig. 1 is a side elevation of a trailer and of towing connections therefor, in which the invention is embodied.

The main features of the device illustrated, which combine to form the structure of the invention, are in Fig. 1 shown to comprise a trailer body A, mounted to ride on side wheels 1; a connecting device B; a coupling C; and an auxiliary wheel assembly D.

A trailer of the type illustrated and herein described is mounted on a frame which usually terminates in a tongue 3, to the free end of which is rigidly secured a saddle 4. This saddle is shown centrally channeled at 5 to receive a member 6, terminating at its forward end in a coupling element 7. A pivot 8 is horizontally seated in the saddle, and it extends through a perforation of the member 6, thereby to combine the two parts for relative rotation in a vertical plane. The channel in the saddle is made deep enough to afford such vertical rotation, and it is shown fitted with resilient bumpers 10, 11, provided for the purpose of limiting this movement.

A boss 12 extends downward from the rear end of the member 6, and this boss is vertically perforated to receive the pivot of a bifurcated frame 14, in which a caster wheel 15 is rotatably hung. This frame is made in two parts, pivotally combined at 16, and suitable spring means is shown interposed between the two parts for the purpose of urging the wheel 15 against the road surface. The auxiliary wheel assembly shown is the commercially well known "Saginaw" caster wheel, but other suitable wheel devices may, of course, be substituted.

From the foregoing brief description, it is seen that a portion of the weight of the overhanging trailer front is carried by the caster wheel 15. If the pivot 8 were moved rearward into axial alignment with the pivot 13, it would follow that this load would be carried entirely by the caster wheel so long as the member 6 remained in the position indicated in the drawings. Also, that, if due to irregularities in the roadbed, the drawbar 2, of the towing vehicle, should rise sufficiently to cause the member to touch the bumper 11 and to raise the saddle 4, it is seen that the entire load suddenly would be thrown on the towing vehicle.

Conversely, if the drawbar 2 should, due to roadbed irregularities, be caused to dip and thereby to swing the member 6 until arrested by the bumper 10, it is seen that the weight of the rear end of the towing vehicle suddenly would be thrown on the caster wheel. The result, in either case, would be that the towing vehicle as well as the wheel assembly D would be subjected to terrific strains; that the incidental bumping would be most uncomfortable to the occupants of the towing vehicle; and that much traction power would be wasted.

If, on the other hand, the pivot 8 were moved forward into axial alignment with the coupling C, it is seen that the entire load continuously would be carried by the towing vehicle, and this is the condition where the conventional, rigid connection between the coupling and the trailer is employed.

Tests and experience have taught me that the weight of the part of the trailer in front of its side wheels should be about one-sixth greater than the weight of its rear portion; also that the distance between the pivot 13 and the pivot 8, of the connecting member 6, should be about one-third the distance between the pivot 8 and the coupling C. When these proportions are substantially maintained, it is found that merely sufficient load is carried by the towing vehicle to obtain check for side thrust and to insure proper traction without disturbing its weight distribution by lowering its rear end relative to the front end, thereby to throw the level line of vision off, with consequent loss of safety.

Because the spring means 17 permits the caster wheel to adjust itself to irregularities in the road surface directly affecting it, as well as to load variations caused by vertical movements at the coupling, it is found that the trailer is moved evenly, smoothly, and with the minimum expenditure of power. But while, for this purpose, the member 6 is mounted for limited vertical rotation, it is important to note that the member must be held firmly in the channel 5 against lateral movement in order to transfer all side thrust to the towing vehicle.

The introduction into the towing connection of the caster assembly has the advantage that the operation of uncoupling the trailer from the towing vehicle is greatly facilitated. To this end, a screw 20 is shown seated in a boss at the rear end of the member 6, and this screw may, through the medium of a suitable handle 21, be advanced until it reaches the end of the member and depresses the latter, causing the coupling member 7 to rise clear of its cooperating member. The towing vehicle is thereby separated from the trailer, which latter remains supported on its three wheels without noticeably changing the level alignment of the trailer. It is, of course, as a preliminary to such separation, necessary to unlock the coupling C. In case the auxiliary wheel combination should get out of order, as by a puncture of its tire, it is possible entirely to remove this device by jacking up the front end of the trailer and merely withdrawing the pivot 13. But other, more convenient arrangements may, of course, be substituted.

A second screw 22 is shown seated in a boss at the front end of the saddle. The introduction of this additional screw makes it possible to lock the member 6 rigidly in the towing position indicated, after the wheel 15 has been removed and the trailer front again lowered into this position. The trailer may then be towed to the nearest service station, with the connection made rigid in this manner, for the necessary repairs. Or, if preferred, the screw 22 may be advanced until the member 6 strikes the bumper 10, to cause the wheel to rise entirely free of the ground, and the trailer may then be towed to the nearest service station without the additional work of jacking up its front end to remove the caster wheel.

While the foregoing description is confined to the particular device illustrated in the drawings, I reserve the right to embody in the device modifications within the scope of the appended claims.

I claim:

1. A towing connection for a trailer mounted for oscillation in a vertical plane thereon between adjustable limits but held against lateral movement relative thereto, and means associated with said towing connection yieldingly supporting part of the load imposed thereon.

2. A towing connection for a trailer mounted on the trailer for oscillation relative thereto in a vertical plane between adjustable limits, means associated with said connection supporting part of the load imposed thereon, and means for locking said towing connection against such relative oscillation at any angle between said limits.

3. A towing connection for a trailer mounted on the trailer for oscillation relative thereto in a vertical plane, means for limiting said oscillation, means for locking the connection against such relative oscillation, and means associated with the connection yieldingly supporting part of the load imposed thereon.

4. In a towing device for a trailer having a forwardly extending fixed tongue, a connecting member terminating at the front end in a coupling element, wheeled supporting means seated on a pivot vertically fixed in the rear end of said member, and a pivot horizontally seated in the member intermediate its ends and in the free end of said tongue to render the member rotative thereon in a vertical plane within adjustable limits.

5. A trailer towing connection comprising, a connecting member pivotally secured intermediate its ends to the trailer frame for vertical oscillation relative thereto, said member terminating in front in a coupling element, and a resilient caster wheel assembly supporting the rear end of the member, and adjustable means positively limiting said vertical oscillation.

6. A trailer towing device comprising, a connecting member pivotally secured intermediate its ends and nearer its rear end to the trailer frame for vertical oscillation relative thereto but held against lateral movement relative thereto, a coupling element at the front end of the member, and a resilient caster wheel assembly supporting the rear end of the member, and adjustable means limiting vertical oscillation of the member.

7. A towing device for a trailer comprising, a connecting member terminating at the front in a coupling element, a pivot vertically seated in the rear end of the member, a resilient wheel frame mounted to rotate on said pivot, a wheel in said frame supporting the rear end of the member, a horizontal pivot interconnecting the member with the trailer frame, resilient means limiting rotation of the member on said horizontal pivot, and adjustable means for further limiting such rotation.

8. A towing device for a trailer comprising, a connecting member terminating at the front in a coupling element, a pivot vertically seated in the rear end of the member, a resilient wheel frame mounted to rotate on said pivot, a wheel in said frame supporting the rear end of the member, a horizontal pivot seated in the member nearer said vertical pivot to connect the member with the end of the trailer frame, resilient means limiting rotation of the member relative to the trailer frame, and means holding the member against lateral movement relative thereto.

9. The combination with a trailer having an overbalanced front and a tongue extending therefrom, of a member horizontally perforated intermediate its ends, a pivot seated in said perforation and interconnecting the member with the tongue for relative rotation, coupling means at the forward end of the member, a wheel assembly supporting its rear end, the location of said pivot being calculated to throw substantially two thirds of the over-balanced trailer load on said wheel assembly, resilient means limiting rotation of the member, and means checking lateral movement thereof relative to said tongue.

10. A towing connection for a trailer mounted for limited oscillation in a vertical plane relative to the trailer, adjustable means for limiting oscillations of the connection, and means associated with said towing connection supporting part of the load imposed thereon.

11. The combination with a tractor having a coupling element and a trailer made with a forwardly extending fixed frame, of a pivot transversely seated in the front end of said frame, a towing connection fitted at its front end to engage said coupling element and mounted for vertical oscillation on said pivot in the open space between the tractor and trailer, and adjustable means for regulating the limits of oscillation of said towing connection.

12. The combination with a tractor having a coupling element and a trailer made with fixed frame members extending forwardly of the trailer, a channeled frame rigidly secured to the front end of said members, a pivot transversely seated in said frame, a towing connection fitted at its front end to engage said coupling element and fitted to oscillate vertically on said pivot within said frame channel, and adjustable elements in front of and behind said pivot for limiting oscillations of said connection, all of said connection being positioned in the open space between the tractor and trailer.

13. The combination with a tractor having a coupling element and a trailer provided with fixed frame members extending forwardly of said trailer, of a channeled frame rigidly secured to the front end of said members, a pivot transversely seated in said frame, a towing connection fitted at its front end to engage said coupling element and fitted to oscillate vertically on said pivot within the channel of said frame, resilient bumpers in said channel to check oscillations of the towing connection, and adjustable elements in front of and behind the pivot for limiting such oscillations, every part of said towing connection being positioned within the open space between the tractor and the trailer.

14. The combination with a tractor having a coupling element and a trailer provided with fixed frame members forwardly extending from the trailer, of a channeled frame secured to the front end of said members, a pivot transversely seated in said frame, a towing connection fitted at its front end to engage said coupling element and fitted to oscillate vertically on said pivot within the frame channel, a pivot vertically depending from the rear end of the connection, a caster wheel combination seated on said second pivot to carry a portion of the load imposed by the trailer on the tractor, and adjustable elements in front of and behind said first named pivot for limiting oscillations of the connection, every part of and associated with the connection being positioned in the open space between the tractor and the trailer.

15. In combination with a tractor vehicle and a trailer, towing means mounted for vertical oscillation on said trailer in the open space between the two vehicles comprising, a channeled frame rigidly affixed the front end of the trailer frame, a bar pivotally mounted in the channel of said frame and terminating at front in a coupling element, a caster wheel combination mounted in the rear end of the bar, resilient bumpers at the ends of the channel of said frame for limiting oscillations of said bar, and adjustable members at the ends of the channeled frame for further limiting and entirely stopping oscillations of the bar.

16. A towing connection for a trailer mounted for oscillation in a vertical plane thereon between adjustable limits comprising, a saddle on the trailer tongue, a lever member hung on said saddle intermediate its ends, and adjustable stops for the lever in the saddle on each side of said joint of the lever on the saddle.

17. A towing connection for a trailer mounted for oscillation in a vertical plane thereon between adjustable limits comprising, a saddle on the trailer tongue, a lever member having a pivot intermediate its ends fixed to rotate in said saddle, adjustable stops for the lever mounted in the saddle on each side of said pivot, and resilient bumpers associated with said stops.

18. In combination with a trailer having a forwardly extending tongue, a towing connection pivotally mounted intermediate its ends on said tongue freely to oscillate on its pivot, adjustable stops for limiting the oscillations of the connection, and means associated with said connection yieldingly supporting part of the load imposed thereon.

19. In combination with a trailer having a forwardly extending tongue, a towing connection pivotally mounted intermediate its ends on said tongue freely to oscillate on its pivot, adjustable stops for limiting the oscillations of the connection, and means associated with the rear end of the connection and positioned beneath said tongue for yieldingly supporting part of the load imposed upon the connection.

20. In combination with a trailer having a forwardly extending tongue, a towing connection pivotally mounted intermediate its ends on said tongue freely to oscillate on its pivot, means for limiting the oscillations of the connection, and means associated with the rear end of the connection and positioned beneath said tongue for yieldingly supporting part of the load imposed upon the connection.

21. A towing connection for a trailer attachable to a towing vehicle comprising, a lever pivotally mounted intermediate its ends to the forward end of the trailer freely to oscillate in a vertical plane, said connection having a coupling element at its forward end, means limiting oscillations of said lever, and means associated with the rear end of the lever yieldingly supporting part of the load imposed thereon.

22. The combination with a tractor having a coupling element and a trailer made with a forwardly extending fixed frame, of a pivot transversely seated in the front end of said frame, a towing connection fitted at its front end to engage said coupling element and mounted intermediate its ends to oscillate freely on said pivot between fixed stops in the open space between the tractor and the trailer, and means fitted to the rear end of the towing connection yieldingly supporting part of the load imposed on the connection by the trailer.

OMAR SUTTLES.